United States Patent [19]

Fay

[11] 4,026,109

[45] May 31, 1977

[54] DUAL SIDE-BY-SIDE MASTER CYLINDER

[76] Inventor: Clarence C. Fay, 17211 Edgewater Drive, Lakewood, Ohio 44107

[22] Filed: June 4, 1976

[21] Appl. No.: 692,869

[52] U.S. Cl. .................................. 60/581; 60/582; 60/534

[51] Int. Cl.² ......................................... F15B 7/00

[58] Field of Search ............ 60/581, 582, 594, 534, 60/535

[56] References Cited

UNITED STATES PATENTS

| | | | |
|---|---|---|---|
| 2,615,105 | 10/1952 | Whitney | 60/534 X |
| 3,021,677 | 2/1962 | Miller | 60/581 |
| 3,336,597 | 8/1967 | Fay | 60/581 |
| 3,370,426 | 2/1968 | Fay | 60/581 |
| 3,724,210 | 4/1973 | Kobashi et al. | 60/581 |

*Primary Examiner*—Edgar W. Geoghegan

[57] ABSTRACT

There is provided an improved dual side-by-side master cylinder having parallel pistons, one for each of two hydraulic sub-systems, and an actuator to move the pistons from a single applied force, e.g., a brake pedal, characterized by an improved structure for the actuator and its coacting rocking beam member for equalizing pressures in the two hydraulic sub-systems and for providing for takeover for direct transmission of force to one piston in the event of failure in the other sub-system.

4 Claims, 3 Drawing Figures

DUAL SIDE-BY-SIDE MASTER CYLINDER

BACKGROUND OF THE INVENTION AND PRIOR ART

In my prior U.S. Pat. Nos. 3,336,597 and 3,370,426, I have disclosed master cylinders of the dual side-by-side type, and actuators for transferring a single axially applied force and dividing the applied force for distribution to each of two parallel pistons moving in cylinders within the master cylinder housing. In each of these structures, the outer ends 89 and 89a of the parallel pistons therein shown and described have been shaped to accommodate a rocking beam member coacting between the piston actuator and points on the pistons which are intermediate the extremities of the piston. Also, the structure of the piston actuator as shown in FIG. 10 of each of these patents is somewhat more complicated in order not only to accommodate disposition between the ends of the parallel pistons, but also to provide for the "takeover" features described in each of these patents. As will be appreciated, the amount of machining operations required to fabricate not only the pistons, but also the piston actuator element are relatively numerous, and therefore costly. In accordance with the present invention, however, the structure is greatly simplified, and therefore rendered less costly to manufacture than with the prior devices, while at the same time maintaining the equalizing and takeover features of the prior structures.

BRIEF STATEMENT OF THE INVENTION

Briefly stated, the present invention is an improvement in a dual side-by-side master cylinder for hydraulic brakes having dual isolated hydraulic sub-systems. The master cylinder includes a housing, a pair of parallel cylinder bores in the housing, and a piston reciprocably movable in each of said bores and each defining at its inner end with the cylinder a fluid chamber. Means are provided for transmitting at least a portion of the singly applied forces, e.g., from a brake pedal, to the outer ends of the pistons respectively to pressurize hydraulic fluid contained in the respective chambers. The piston actuator is movable in the housing along an axis parallel to the axes of the pistons and having an inner end normally spaced from the outer ends of the pistons and an outer end for receiving the single axially applied force.

The foregoing structures are improved in that portions of the inner end of the actuator are dimensioned to be overlapping and in confronting albeit normally spaced relation with portions of the outer ends of the pistons respectively. A rocking beam member is provided for coaction between the piston actuator and the outer ends of the pistons, respectively, for dividing the single axially applied force and applying a portion of said force to each of the pistons, respectively. The rocking beam is pivotally mounted in the piston actuator for rotation about an axis perpendicular to the plane including the longitudinal axes of both of the pistons and between the inner and outer ends of the actuator. The extent of rotation is sufficient to permit engagement of the overlapping and confronting portion of the inner end of the piston actuator with either of the piston ends when the fluid pressure in the other cylinder falls because of failure in the hydraulic sub-system served thereby. Under these circumstances, substantially all of the singly applied force is under these circumstances transmitted directed by the piston actuator to the piston serving the remaining intact hydraulic sub-system.

In more specific embodiments of the present invention, the piston actuator is formed with a transverse slot and the rocking beam member is pivotally mounted in the slot and extends laterally beyond the extremities of the slot for engagement with the outer ends of the respective pistons.

BRIEF DESCRIPTION OF THE DRAWINGS

The invention may be better understood by having reference to the annexed drawings wherein.

DETAILED DESCRIPTION OF THE DRAWINGS

Figure 1:
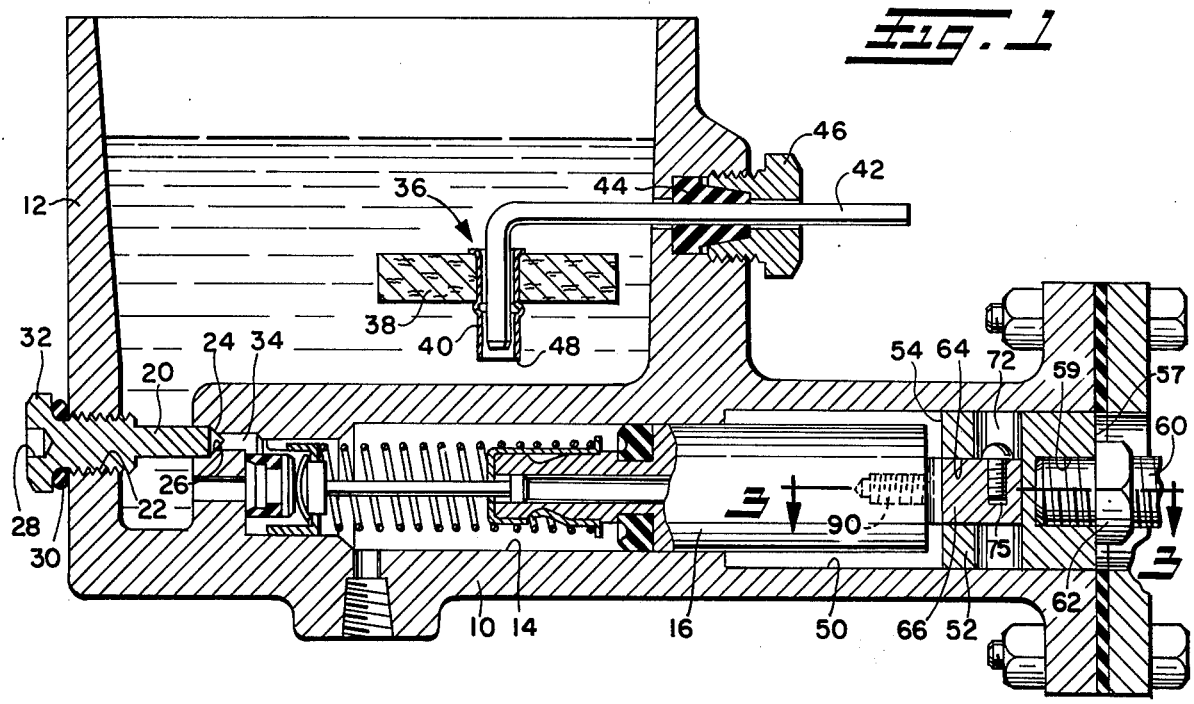
FIG. 1 is a cross-sectional view through one of the piston cylinder assemblies of the dual master cylinders in accordance herewith and showing the arrangement of the piston actuator and the pistons with the rocking beam member coacting therebetween.
Figure 2:
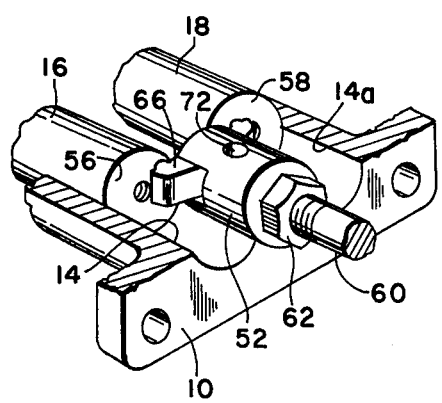
FIG. 2 is a fragmentary partially cut-away perspective illustration also showing the arrangement of the side-by-side pistons and the piston actuator-rocking beam assembly.
Figure 3:
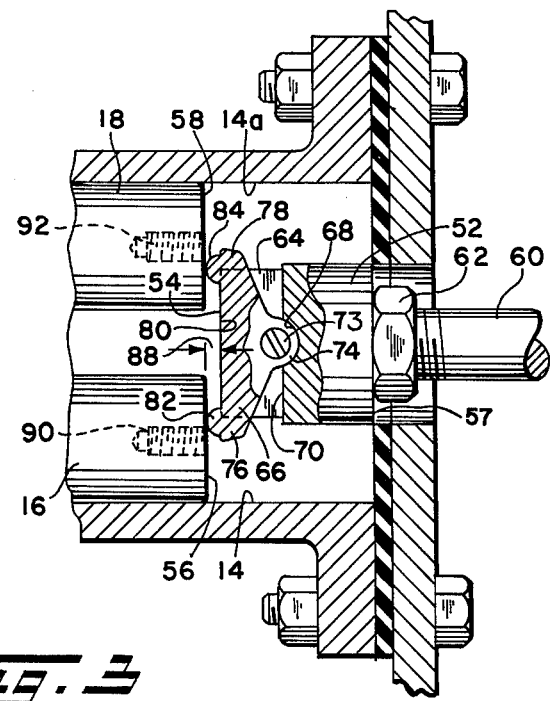
FIG. 3 is a fragmentary cross-sectional view of the apparatus shown in FIG. 1 as it appears in the plane indicated by the line 3—3 of FIG. 1.

Referring now more particularly to FIGS. 1–3, inclusive and with the exceptions hereinafter more particularly noted, the structures described in the aforesaid prior patents, and those contemplated hereby are quite similar. As indicated above, the improvement is in the structure of the outer piston ends, the rocking beam and the piston actuator.

Accordingly, there is provided a master cylinder housing 10 having an integral hydraulic fluid reservoir 12 which, as shown in the prior patents, is conveniently divided and provided with a cover not shown in the present drawings. The cylinder housing 10 is provided with parallel cylinder bores 14 and 14a in which pistons 16 and 18 operate as hydraulic fluid pressurizing means for the respective hydraulic sub-systems. As indicated in the prior patents, these hydraulic sub-systems are isolated from one another so that a failure in one hydraulic sub-system leaves the remaining hydraulic sub-system intact and operative to actuate the brakes served by the remaining hydraulic sub-system. The details of connecting the master cylinders of the present invention into a dual hydraulic 2+2 brake system for automotive vehicles, for example, are clearly set forth in my previous patents above mentioned.

In the embodiment shown in FIG. 1, there is provided a bleeder for removing entrapped gas from within the cylinder 14, for example. The bleeder comprises a threaded shaft or pin 20, longitudinally slotted in a known manner, extending through a tapped bore 22 in the side wall of the reservoir 12. The inner end of the pin 20 is provided with a valve 24 adapted to be seated against a seat 26 when the pin 20 is rotated in a clockwise direction and unseated therefrom when oppositely rotated. A suitable socket for engagement by an Allen type wrench (28) is provided for rotation of the bleeder valve. Suitable gasket means 30 coact between the head 32 and the side wall 12 to prevent loss of hydraulic fluid. When the valve 24 is removed from its seat 26, the port 34 is open and air may excape from the upper portion of the cylinder 14 in a known manner.

Also provided in the device shown in FIG. 1 is a submerged liquid level indicator and warning mechanism generally indicated at 36. This device includes a normally submerged float 38 having extending therethrough a metallic sleeve 40. An L-shaped metallic conductor 42 extends through the side wall of the reservoir 12 and is fitted with a suitable liquid sealing packing means such as the plug 44 and a packing nut 46. When the lower edge 48 of the sleeve 40 comes in contact with the housing 10 indicating a low fluid level, an electrical ground circuit is completed igniting a warning light on the instrument panel, for example. A feature of this particular structure is that it enables manufacturers of master cylinders to utilize current cover sealing means or bellows without further modification.

The liquid level indicating means while in a preferred embodiment of the present invention, is not an essential part hereof. Also, external bleeding means outside of the reservoir as distinct from the bleeding means shown in my prior patents is also not an essential part of the present invention.

The housing 10 is provided with an enlarged bore 50 to accommodate selective reciprocal movement of a piston actuator 52 which is best shown in FIG. 2. The actuator 52 is provided with an inner end 54 which is normally in overlapping and confronting axially spaced relation to he outer ends 56 and 58 of the pistons 16 and 18, respectively. The axis along which the piston actuator 52 moves preferably lies in the same plane as that which includes the longitudinal axes of pistons 16 and 18. While it is not necessary for the longitudinal axis of the piston actuator, which is also generally of cylindrical shape, to lie in the same plane as the axes of the pistons 16 and 18, this is a preferred embodiment. In any event, the axis of the piston actuator 52 should be parallel to the axes of the pistons 16 and 18. The actuator 52 is provided at its outer end 57 with a threaded bore 59 for receiving the threaded end 60 of a conventional Pitman bar which is in turn actuated by the brake pedal. A suitable locking nut 62 may be provided to secure the actuator 52 to the distal extremity of the Pitman bar 60.

The inner end of the actuator 52 is provided with a transverse slot 64 which is readily cut into the cylindrical member 52 by conventional means.

In order to divide and distribute the force imposed on the piston actuator 52 by the Pitman bar 60, there is provided a rocking beam member 66 which is dimensioned for easy rotational movement within the slot 64. An arcuate recess 68 is provided in the rear face 70 of the slot 64 by simply drilling a hole 72 through the actuator 52 at right angles to the transverse slot. The rocking beam 66 is then provided with a mating arcuate projection 74 which is accommodated by the recess 68 as a fulcrum for the rocking beam 66. The laterally extending ends 76 and 78 of the rocking beam 66 overlap the ends of the pistons 16 and 18 and beyond the limits of the slot 64. In order words, the lateral dimension of the rocking beam 66 exceeds the diameter of the piston actuator 52 in a preferred case. The forward face 80 of the rocking beam 66 is conveniently provided with projections 82 and 84 desirably of semi-cylindrical geometrical configuration for abutting co-action with the piston ends 56 and 58.

The extent of projection of the projections 82 and 84 beyond the inner end 54 of the actuator 52 determines the takeover clearance 88 between the actuator and the ends of the pistons 16 and 18.

In operation, as will best be seen from FIG. 3, when a single axially force is imposed upon the piston actuator 52 through the Pitman bar 60, the rocking beam 66 which is carried in the slot 64 serves as a means for dividing the applied force between the ends of the pistons 16 and 18. Thus, if a 100 pound force is imposed on the piston actuator 52 through the Pitman bar 60, by operation of the rocking beam 66, 50 pounds of force are applied to the pistons 16 and 18, respectively, to move them in an axial direction and pressurize the fluid in the cylinders, e.g., cylinder 14. In the event that failure occurs in the sub-system served by piston 16, for example, the resistance to movement of the piston 16 will fall to a much lower value, while the resistance to movement of the piston 18 will remain high. The rocking beam 66 under these conditions will rotate about the fulcrum formed by the recess 68 and the projection 74 in a clockwise manner whereby the projection 84 is retracted relative to the end 54 of the piston actuator 52. This will allow the overlapping end of the forward face 54 of the piston actuator to come in direct contact with the end 58 of the piston 18. In the meantime, the piston 16 moves against relatively no opposition and due to the action of the rocking beam 66, the space 88 is increased insofar as piston 16 vis-a-vis the actuator 52 is concerned. At the same time, the space 88 is reduced to zero in the case of piston 18 vis-a-vis the piston actuator 52. Thus, the entire applied force of 100 pounds is now transmitted directly to the outer end 58 of the piston 18.

Exactly the reverse operation would occur in the event that the rupture occurred in the hydraulic sub-system serviced by the piston 18 while the hydraulic system serviced by the piston 16 remained intact. The takeover distance 88 is important since it determines how far the brake pedal will move before takeover occurs and the brakes may be applied through the remaining intact hydraulic sub-system. A small distance, for example 3/32 inch for the gap 88 will translate to a pedal movement of between 0.5 and 0.75 inch. This is a sufficient distance to warn the driver that there is likely a problem in one of the hydraulic sub-systems. This movement is generally insufficient to cause panic on the part of the driver. In contradistinction to this, however, where the dual master cylinder is of the conventional tandem type, movement of the brake pedal through distances of from 1.25 to 2 inches against very small resistance is commonly experienced upon failure of one of the hydraulic sub-systems. Then the resistance of the intact sub-system is encountered and the driver can experience braking so long as panic has not supervened.

The ends 56 and 58 of the pistons 16 and 18, respectively, may be drilled and tapped as at 90 and 92, respectively, to provide a place on disassembly of the apparatus for the insertion of threaded screws to facilitate removal of the pistons 16 and 18 from the master cylinder housing 10. A screw 73 is conveniently provided in a blind bore 75 in the portion 74 to aid in holding the rocking beam member in the actuator 52 during assembly. It has no other purpose.

The master cylinder housing is secured in a known manner to the firewall of an automotive vehicle.

What is claimed is:

1. In a dual side-by-side master cylinder for hydraulic brakes having dual isolated hydraulic sub-systems, said master cylinder including a housing, a pair of parallel cylinder bores in said housing, a piston reciprocably movable in each of said bores and each defining at its inner end with said cylinder a fluid chamber; and means for transmitting at least a portion of a singly applied force to the outer ends of said pistons, respectively, to pressurize hydraulic fluid contained in said respective chambers, the improvement in said means which comprises a. a piston actuator movable in said housing along an axis parallel to the axes of said pistons and having an inner end normally spaced from the outer ends of said pistons and an outer end for receiving a single axially applied force, portions of the inner end thereof overlapping and confronting portions of the said outer ends of said pistons, respectively and b. a rocking beam member coacting between said piston actuator and the outer ends of said pistons, respectively for dividing said single axially applied force and applying a portion of said force to each of said pistons, respectively, said rocking beam being pivotably mounted in said piston actuator for rotation about an axis perpendicular to the plane including the longitudinal axes of both of said pistons and between the inner end and outer ends of said actuator an amount sufficient to permit engagement of the overlapping and confronting portion of said inner end of said piston actuator with either of said piston ends when the fluid pressure in the other cylinder falls because of failure in the hydraulic sub-system served thereby, whereby substantially all of the singly applied force is transmitted directly by said piston actuator to the piston serving the remaining hydraulic sub-system.

2. A dual side-by-side master cylinder in accordance with claim 1 wherein the piston actuator is formed with a transverse slot and the rocking beam member is pivotally mounted in said slot.

3. A dual side-by-side master cylinder in accordance with claim 2 wherein the transverse slot includes an arcuate recess and the rocking beam includes a centrally located mating arcuate projection.

4. A dual side-by-side master cylinder in accordance with claim 3 wherein the rocking beam is provided with spaced projections adjacent its outer ends for engagement with the outer ends of said pistons, respectively, said projections extending forward of the inner end of said piston actuator to maintain the piston actuator normally spaced from the outer ends of said pistons.

* * * * *